United States Patent [19]

Bauman et al.

[11] Patent Number: 5,127,552
[45] Date of Patent: Jul. 7, 1992

[54] FOAM MIXER-APPLICATOR WITH FOAMING CHAMBER AND METHOD OF USING

[75] Inventors: Therese M. Bauman, Wayne County; Todd S. Klenk, Livingston County, both of Mich.

[73] Assignee: Dow Corning Corporation, Midland, Mich.

[21] Appl. No.: 608,108

[22] Filed: Nov. 1, 1990

Related U.S. Application Data

[63] Continuation-in-part of Ser. No. 398,355, Aug. 24, 1989, abandoned.

[51] Int. Cl.⁵ .......................... B05B 7/04; B05B 15/02
[52] U.S. Cl. ..................................... 222/145; 222/132; 222/389; 239/115; 239/123; 239/416.1; 239/427
[58] Field of Search ................ 222/132, 190, 389, 145; 239/114, 115, 123, 320, 416.1, 418, 427

[56] References Cited

U.S. PATENT DOCUMENTS

| | | | |
|---|---|---|---|
| 2,887,275 | 5/1959 | Dixon, Jr. et al. | 239/427 |
| 2,992,194 | 7/1961 | Paulsen | 239/427 X |
| 3,388,868 | 6/1968 | Watson et al. | 239/427 |
| 3,399,837 | 9/1968 | Frick | 239/415 |
| 3,690,557 | 9/1972 | Higgins . | |
| 3,774,811 | 11/1973 | Staerman | 222/190 |
| 3,974,965 | 8/1976 | Miller | 239/427 X |
| 3,975,128 | 8/1976 | Schlüter | 222/145 X |
| 3,976,248 | 8/1976 | Middleton, Sr. . | |
| 4,213,936 | 7/1980 | Lodrick . | |
| 4,332,335 | 6/1982 | Fiorentini | 222/145 |
| 4,397,407 | 8/1983 | Skoupi et al. | 222/145 X |
| 4,426,023 | 1/1984 | Sperry et al. . | |
| 4,527,712 | 7/1985 | Cobbs, Jr. et al. . | |
| 4,834,268 | 5/1989 | Keller . | |

Primary Examiner—Andres Kashnikow
Assistant Examiner—William Grant
Attorney, Agent, or Firm—John L. Chiatalas

[57] ABSTRACT

A foam mixer-applicator for mixing a two-part foamable composition includes a mixing head having a mixing chamber for impingement mixing of the two component parts of the foamable composition, which are supplied to the mixing chamber in a pre-pressurized state. The mixing head is sealingly connected to a dispensing head having a foaming chamber of a substantially greater capacity than the mixing chamber and an outlet port for discharging the foam composition after foaming and acquiring a higher, yet flowable viscosity. A pneumatic plunger system pushes the foamed composition through an outlet port of the dispensing housing onto a substrate.

19 Claims, 2 Drawing Sheets

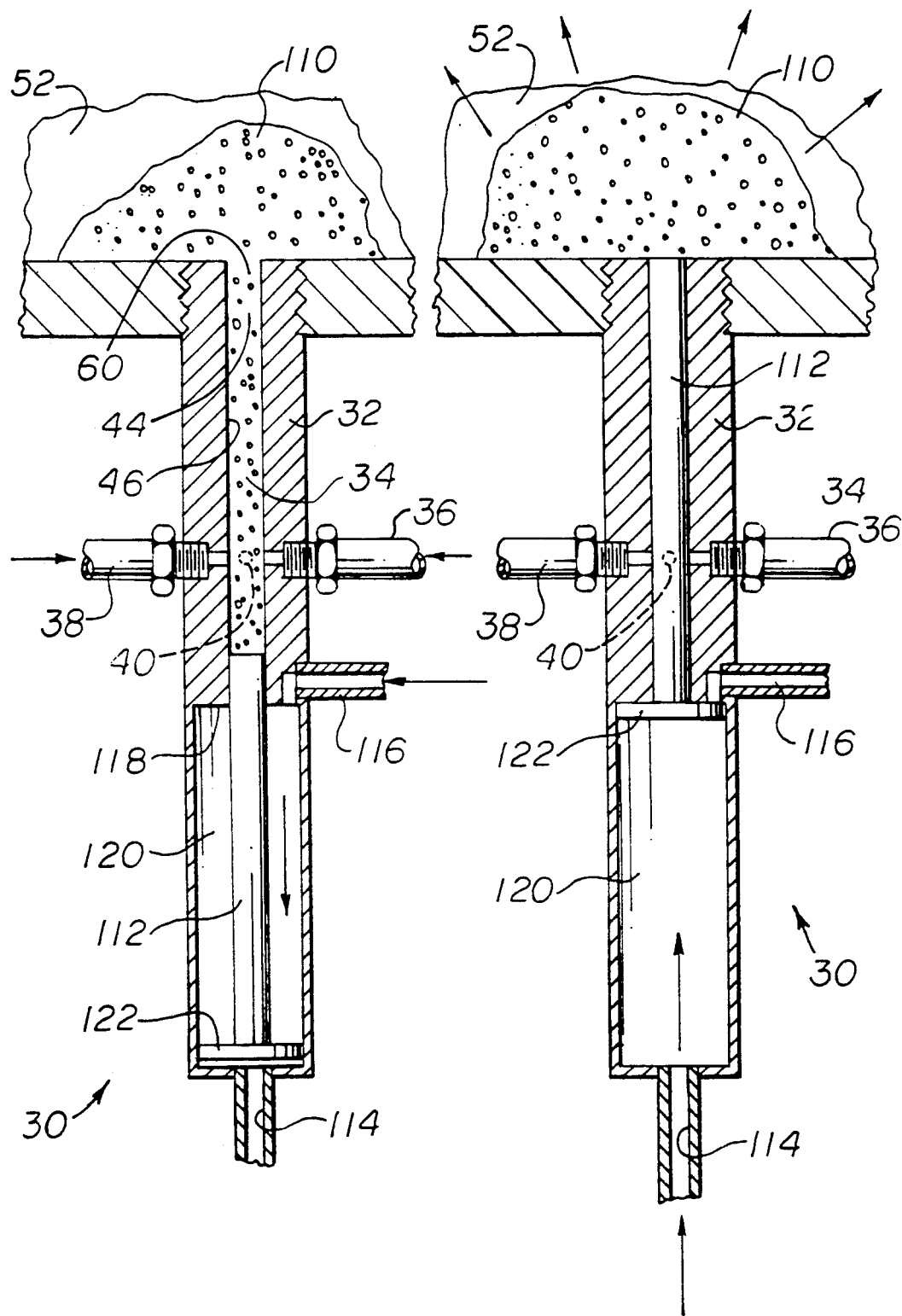

FOAM MIXER-APPLICATOR WITH FOAMING CHAMBER AND METHOD OF USING

BACKGROUND OF THE INVENTION

This application is a continuation-in-part of Ser. No. 398,355, filed Aug. 24, 1989, now abandoned.

This invention relates to devices for mixing and applying foamable compositions and to methods of using the devices.

Various devices for mixing and applying multi-component reactive foamable compositions have been disclosed in the prior art. Many of these devices are concerned with the thorough mixing of the reactive ingredients before discharging the composition from the device. However, when these devices are used to apply a foamable composition to a surface, often the exiting composition is of such a low viscosity that the composition flows too easily, not staying in the desired place of application. This is especially found true when the compositions are slow to foam or slow to cure or the surface for application is on an incline. For example, in automobile manufacturing, voids in the body of the automobiles are sealed at their openings with polymeric foamed-in-place foam for reduction of audible wind, engine, and road noise in the passenger compartment. Often, these voids are vertical or on an incline and are open at the bottom so that low-viscosity compositions would readily flow toward the bottom or out of the void. Depending on the type of foam used, the discharging composition from prior art mixer-applicators may be quite flowable and of high density (low volume per weight). Thus, in instances where the voids are inclined and the sealing compositions have low-viscosity, a relatively large amount of composition is required to seal the top of the void and often metal barriers are added to provide a ledge to retard the flow of material through the void.

U.S. Pat. No. 3,399,837 to Frick discloses a foam spray gun having a mixing chamber with liquid inlet passages cleaned by the mixing air, a toggle arrangement for holding a nozzle on the spray gun body, and a disposable nozzle having a portion of the mixing chamber therein. A stated object of this patent is to provide a foam spray gun in which a disposable nozzle includes a portion of the mixing chamber, i.e., the composition is mixed and dispensed from a common location. The foam spray does not itself mix the composition, rather, it is used as a means of applying the composition to a substrate once mixed. There is no air impingement mixing of the composition under pre-pressurized conditions, rather, a static mixing element is provided in the nozzle whereby the composition flows through a baffle-type arrangement and mixes within the nozzle from which it is dispensed. No mechanical plunger is provided to clear the disposable nozzle.

U.S. Pat. No. 3,774,811 to Staerman discloses an apparatus for producing a foam plastic material by transfer injection. A highly viscous foam plastic is extruded by an extruder screw through an opening into a chamber where the foam expands prior to being dispensed from the tip of the chamber. The foam plastic is not mixed prior to entering the dispensing chamber, rather it is pre-mixed at a remote location prior to being extruded. Because the particular application requires high viscosity plastics to be extruded, the extruder screw is required.

Therefore, there is still a need for a mixer-applicator system which provides rapid mixing of a foamable composition at one location and subsequent foaming and dispensing of the composition from another location in a relatively high-speed repeat cycle process.

SUMMARY OF THE INVENTION AND ADVANTAGES

According to the invention, there is provided a foam mixer-applicator device for mixing a foamable composition and a method for using the device. The device comprises a mixing head containing a mixing chamber having opposed first and second fluid inlet means adapted for introducing impinging fluid streams into the mixing chamber. Means are provided for supplying a continuous but interruptible flow of components of the foamable composition in a pre-pressurized, unmixed state separately to the first and second inlet means, respectively, for impingement mixing of the components in the mixing chamber during a first dwell period. A first outlet port leads from the mixing head for discharging the mixed foamable composition from the mixing chamber. A dispensing head is sealingly attached to the mixing head at the first outlet port, containing a foaming chamber having a substantially greater capacity than the mixing chamber whereby the first outlet port establishes a fluid passageway between the mixing chamber and the foaming chamber. Means are further provided for intermittently discharging the mixed composition from the mixing chamber through the first outlet port into the foaming chamber while arresting the flow of unmixed components entering the mixing chamber, allowing the composition to foam and acquire a higher, yet flowable viscosity during at least a second dwell period. A second outlet port is provided for discharging the foamed composition from the dispensing head, as well as means for pushing the foamed composition through the second outlet port onto a substrate.

In a method of applying a flowable foam to a substrate, the device described immediately above is used in performing the steps of mixing the separate components of a foamable composition in the mixing chamber, discharging the mixed composition into the foaming chamber to partially fill the foaming chamber, allowing the mixed composition to foam in the foaming chamber and increase in viscosity to desired degree and discharging the flowable foam composition through the second outlet port onto the substrate.

In a preferred embodiment, the method further comprises the step of mixing and discharging a two-part foamable composition. Alternatively, a one-part foamable composition may be used, in which case means may be provided for heating the foaming chamber to effect cure. Compressed gas may be added to the composition in order to aid in the air-impingement mixing step.

In another preferred embodiment of the method, timing of the mixing and foaming steps is automatically synchronized by first and second piston strokes to avoid contamination of the mixing and dispensing chambers, respectively.

An advantage of this invention is a device and method of using the device by which an operator can have control over the viscosity and expansion of a discharging foamable composition, thus giving the operator more placement control.

Another advantage of this invention is a method and a device by which foam can be applied to inclined surfaces without ledges with more assurance of the foam staying in place.

A further advantage of this invention is an improved method and device for sealing inclined openings with a foamed material so that less foamed material may be used, resulting in lower overall cost.

BRIEF DESCRIPTION OF THE DRAWINGS

The above and other objects and advantages of the present invention will become apparent to those skilled in the art upon an examination of the following description and drawings which are illustrative of the present invention wherein:

FIG. 2 is an enlarged view of the mixing head of FIG. 1 shown during the mixing step; and FIG. 3 is a sequential view of FIG. 2, showing the mixed foam composition discharged from the mixing head into the foaming chamber during the foaming step.

DETAILED DESCRIPTION OF ONE OR MORE PREFERRED EMBODIMENTS

Figure 1:
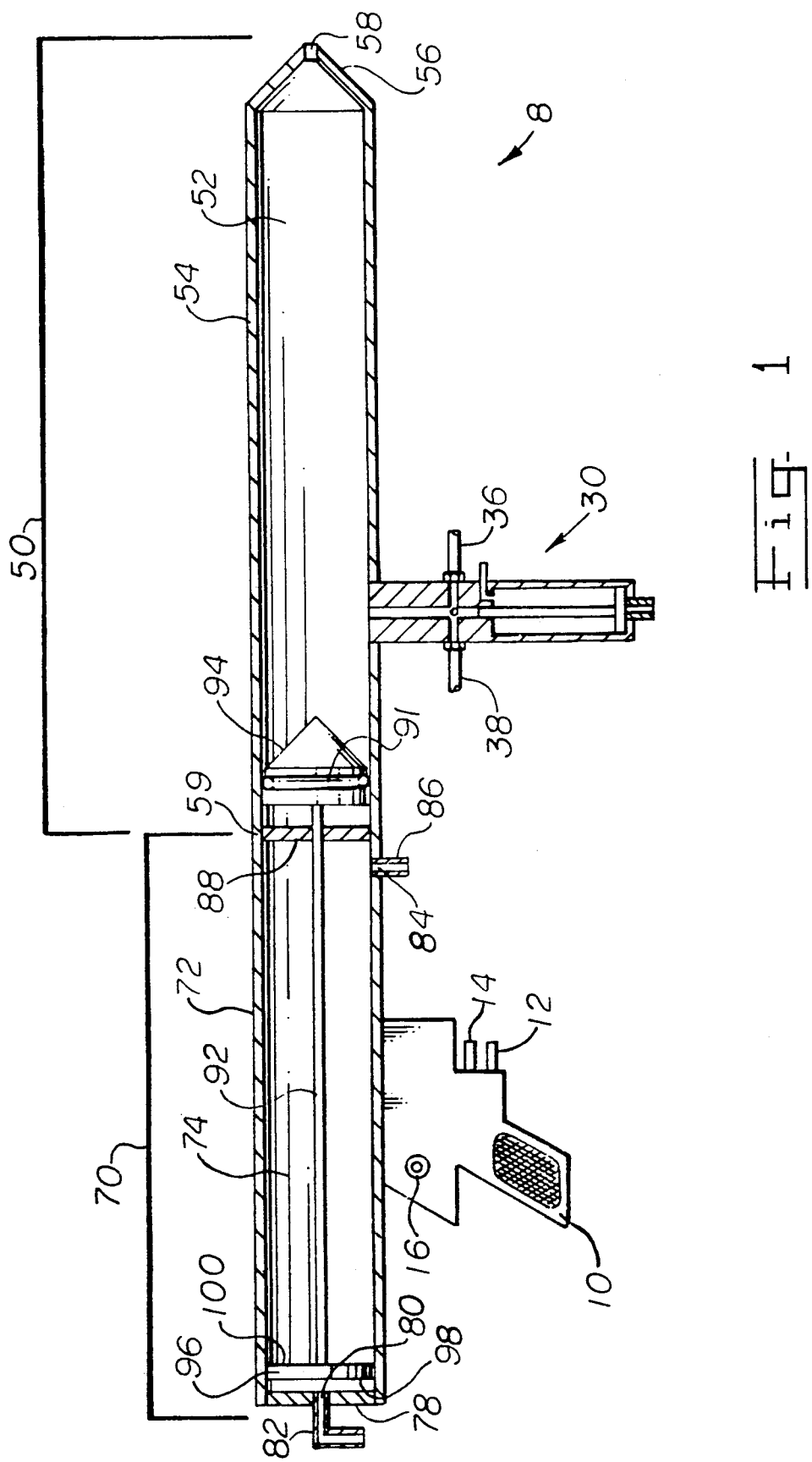
FIG. 1 is a side view in partial section of a foam mixer-applicator device according to this invention.

Referring to FIG. 1, there is depicted a preferred form of a foam mixer-applicator according to the invention. Generally, the mixer-applicator shown in FIG. 1 is indicated by reference numeral 8, including a handle 10, mixing head 30, foaming chamber 50, and air cylinder assembly 70. Mixing head 30 has mixing housing 32 and mixing chamber 34 contained within mixing housing 32. As may be seen more clearly from FIG. 2, inlet means provide passageways 36, 38, and 40 extending from outside mixing head 30 to mixing chamber 34 for entry of fluids into mixing chamber 34. Inlet passageways 36 and 38 each provide an entrance path for a part of a two-part foamable composition 110, and inlet passageway 40 provides entrance of pressurized air or other gas into mixing chamber 34. More inlet passageways may be provided in the mixing housing if needed, for example, as in the case when the composition is formed of more than two parts. Inlet passageways 36, 38, and 40, as shown, are positioned so that pre-pressurized fluid streams entering via passageways 36, 38, and 40 will impinge on each other at fast flow rates for improved mixing. Mixing head 30 also has a first outlet port 44 located at the end opposite inlet passageways 36, 38, and 40, providing an exit for the mixed foam composition from mixing chamber 34. As part of mixing head 30, there is provided an optional mixing channel 46, shown as an elongated portion extending between mixing chamber 34 and outlet hole 44 which, along with the rate of flow of the composition, is designed to allow for better mixing of the multi-part composition before leaving mixing head 30.

Mixing head 30 is sealingly attached, in any suitable manner, to a dispensing head having foaming chamber housing 50, so that outlet hole 44 of mixing head 30 is in fluid communication with inlet port 60 of chamber housing 50. Inlet port 60 leads from outside foaming chamber housing 50 to foaming chamber 52 inside foaming chamber housing 50. Foaming chamber 52 is significantly larger than mixing chamber 34 or than mixing chamber 34 combined with mixing channel 46, as can be appreciated from FIG. 1. As shown in FIG. 3, a controlled amount of mixed foam composition 110 exits mixing head 30 and enters foaming chamber 52 which provides an enclosed space to allow the mixed foam composition to develop, thicken, and foam before being applied to a desired substrate. Foaming chamber housing 50 is shown as a cylindrical container 54 having a conical end 56, and second outlet port 58 located at the tip of conical end 56. The other end 59 of the housing is located opposite the conical end 56. Inlet port 60 is located on the side of cylindrical container 54 near location 59.

Foaming chamber housing 50 is attached to a means for discharging foamed composition from foaming chamber 52 through outlet port 58. The means shown for discharging the foamed composition, air cylinder assembly 70, includes a cylindrically-shaped air cylinder housing 72 containing air cylinder chamber 74. An end of air cylinder housing 72 is sealingly attached to foaming chamber housing 50 at location 59, and end 78 is closed and has air inlet opening 80 with fitting 82. On the side of air cylinder housing 72 close to location 59, is air inlet opening 84 with fitting 86.

Inside the housings, at the connection between foaming chamber housing 50 and air cylinder housing 72, there is round disc 88 having aperture 90 in its center. Fitting 86 and air inlet opening 84 must be on the side of round disc 88 that is facing end 78 of air cylinder housing 72. Round disc 88 has a diameter similar to the inside diameters of air cylinder housing 72 and foaming chamber housing 50 and is permanently and sealingly fixed inside the housings so that the diameter of round disc 88 meets the inside diameter of the housings. Through aperture 90 extends rod 92 which has connected at one end plunger head 94. Aperture 90 is sized so that rod 92 sealingly glides through aperture 90. To ensure an airtight relationship between disc 88 and rod 92, disc 88 may have a rubber O-ring located in aperture 90. Rod 92 and plunger head 94 are positioned so that plunger head 94 is inside foaming chamber housing 50. Plunger head 94 is dimensioned to matingly fit inside conical end 56. Attached to the other end of rod 92 is circular seal 96 which has the same diameter as and is in sealing relationship with the inside diameter of air cylinder chamber 74. For example, seal 96 may have a rubber O-ring around its circumference to provide a tighter seal with the inside surface of air cylinder chamber 74. Seal 96 has two sides, side 98, which faces end 78 of air cylinder housing 72, and side 100, which faces foaming chamber 50. The space between closed end 78 of air cylinder housing 72 and side 98 of seal 96 must be essentially air-tight for the air cylinder to operate, which will be further described below. Seal 96, rod 92, and plunger head 94, which together make up the "plunger system", are all longitudinally movable together within air cylinder housing 72 and foaming chamber housing 50. When plunger head 94 meets conical end 56, conical end 56 serves as a means to stop the plunger system from travelling further. In the reverse direction, when the plunger system is returning to the retracted position, and seal 96 meets closed end 78, closed end 78 serves as a means to stop the plunger system from travelling further. Disc 88 may also serve as a means to limit the distance the plunger system can travel toward conical end 56 because seal 96 could not travel past disc 88.

During operation, when pressurized air is added to air cylinder chamber 74 through air inlet opening 80 so that the air pressure at side 98 of seal 96 exceeds the air pressure at side 100 of seal 96, the plunger system is pushed in the direction of conical end 56 causing the contents of foaming chamber 52 to empty through outlet port 58. In order for pressurized air to push seal 96 toward conical end 56, the space in air cylinder chamber 74 between seal 96 and closed end 78 must be essentially air-tight. The total length of the plunger system should also be dimensioned so that when it is pushed flush to outlet port 58, plunger head 94 fits inside conical end 56, so that any foamed composition inside foaming chamber 52 is pushed out of outlet end 58. In this manner, the plunger system cleans the foaming chamber 52 of foam composition without the use of solvents. The total length of the plunger system should be dimensioned with respect to the location of air inlet opening 84, so that when it is pushed toward outlet port 58, air inlet opening 84 is between seal 96 and round disc 88. This essentially means that the length of the plunger system must be at least slightly longer than the length from air inlet opening 84 to outlet end 58. When pressurized air is added to air cylinder chamber 74 through air inlet opening 84 so that the pressure on side 100 of seal 96 exceeds the pressure on side 98 of seal 96, the movable plunger system is retracted or forced toward end 78 of air cylinder housing 72. For this operation to occur, the space in air cylinder chamber 74 between disc 88 and seal 96 must be substantially air-tight. In the retracted position, the foaming chamber 52 is ready to be filled with foamable composition.

Handle 10 is attached to air cylinder housing 72 to allow mixer-applicator 8 to be hand-held and operated. Handle 10 has triggers 12, 14, and 16 which are connected via air lines to the appropriate pneumatically-controlled valves (connection and valves not shown) for activating the air addition to air cylinder chamber 74 (thus, activating the plunger system), and the addition of the composition components to mixing chamber 34.

During use of mixer-applicator 8 shown in FIG. 2, trigger 14 is first activated when the plunger system in the mixing chamber 52 is in the retracted position to allow pressurized air and pressurized components of a two-part foamable composition to enter the mixing chamber 34 through inlet passageways 36, 38, and 40, thus causing impingement mixing of the components and air. To the extent the composition 110 does not mix instantaneously, the composition travels through mixing channel 46 where it does become thoroughly mixed and then dumps into and partially fills foaming chamber 52. The composition 110, upon entering foaming chamber 52, needs no further mixing and no significant mixing occurs in foaming chamber 52. There are no baffles or means for mixing the composition needed inside the foaming chamber; the foaming chamber, therefore, can be an essentially empty chamber, as shown. Once foaming chamber 52 is filled to the desired degree, the addition of air and reactants to mixing head 30 is discontinued, as detailed immediately below.

Referring to FIG. 2, the foam mixer-applicator device is shown configured for accomplishing the mixing of components of a two-part foamable composition. In operation, the separate components are introduced into the mixing chamber 34 through the opposed first 36 and second 38 fluid inlet means, which are adapted for mixing the dual fluid streams by impingement mixing in the mixing chamber 34. Supply means (not shown) for supplying a continuous but interruptible flow of the components in a pre-pressurized, unmixed state may comprise any conventional pump or fluid compression system. As described previously, the separate components of the two-part foamable composition undergo rapid mixing by impingement mixing of the pre-pressurized fluid streams from the opposed inlet means 36 38, remaining in the mixing chamber for a first dwell period and dumping into the foaming chamber 52 through the first outlet port 60 provided for discharge of the mixed foamable composition from the mixing chamber 34. Because the dispensing head is sealingly attached to the mixing head 30 at the first outlet port 60, a fluid passageway through the channel 44 is established between the mixing chamber 34 and the foaming chamber 52 contained within the dispensing head.

The addition of air and reactants to the mixing head 30 is controlled by operation of a piston 112, which is reciprocable within an air cylinder 114 sealingly attached to the mixing chamber 34. During the retracted or backward stroke of the piston 112, the inlet means 36, 38, and 40 are open to allow a selected amount of the components to flow into the mixing chamber and undergo impingement mixing.

The piston 112 is shown displaced in FIG. 3 during the foaming step. As seen above, after a specified period of time, calculated to separately introduce the required amounts of pressurized components into the mixing chamber 34 as are necessary to provide the desired amount of foamed composition, the forward stroke displaces the piston 112 in the cylinder 120. The forward stroke of the piston 112 completely discharges the mixed composition 110 from the mixing chamber 34 into the foaming chamber 52 while arresting the flow of unmixed components entering the mixing chamber 34 via blockage of the inlet means 36, 38. The mixed composition which has been pushed out from the first outlet port 60 is thus allowed to foam and acquire a higher, yet flowable viscosity (see arrows in FIG. 3) for a second dwell period in the foaming chamber 52 but is prevented from flowing back into the mixing chamber 34. The piston 112 is controlled by pneumatic means such as the ports 114, 116. The triggers 12, 14 act as valves controlling the total air supply. When the total air supply to the valves 12, 14 in a normal state, neither of the triggers are actuated. In the normal state, pneumatic pressure to the ports 84, 114 keep the inlet means 36 38 blocked by actuation of the piston 112 to be displaced forward in cylinder 120 until the flange portion 122 thereof abuts the shoulder 118 of the piston cylinder 120 (FIG. 3). Once the foaming step is complete and the composition 110 is fully dispensed onto a substrate, the device is ready for another process cycle. As shown in FIG. 2, when components of the mixture are being supplied to the air impingement mixing chamber 34, the trigger valve 14 is depressed, air pressure is dropped off from the port 114 and the pressure to the port 116 is restored, displacing the piston 112 in a backward stroke in the cylinder 120 to uncover the inlet means 36, 38, thus restoring the flow of foamable components. The unmixed components flow into the mixing chamber 34 in a timed delivery, after which pressure is automatically dropped off the port 116 and applied to the port 114, forcing evacuation of the mixing chamber 34 by displacement of the piston 112 in its forward stroke to shut off the flow of components. This forward stroke also automatically cleans the mixing chamber 34 of any residual mixed composition. It should be noted that the end portion of the piston 112, located opposite the flange portion 122 thereof, completely fills the first outlet port 60 (FIG. 2) but does not project into the foaming chamber 52 (FIG. 3), so as not to obstruct axial movement of the plunger 94. Movement of the plunger 94 during the dispensing step likewise is synchronized by an automatic timing mechanism which maintains forward displacement of the piston 112 as the plunger 94 moves forward in the direction of second outlet port 58. O-ring seals 91 are provided on the plunger 94 similar to those used on disc 96, to scrape the walls of the foaming chamber 52 clean of residual foamed composition while maintaining the pneumatic seal intact. The second dwell period of the mixed composition in the foaming chamber 34 can also be synchronized with dispensing on a substrate by the same or other timing means.

The extent of filling foaming chamber 52 depends on the degree of foaming or expansion desired before discharging the foamed composition from the foaming chamber 52 and the quantity of foam desired. Once the foam reaches the desired expansion and viscosity, trigger 16 is activated so that pressurized air is added to air cylinder chamber 74 through air inlet opening 80, so that the plunger system is forced forward toward conical end 56 of foaming chamber housing 50. The plunger system forces the foamed, yet flowable, composition out of the foaming chamber through outlet port 58, where the operator may direct its application to a desired substrate. This plunging action also provides the foaming chamber with a way of self-cleaning and without the use solvents. After foaming chamber 52 is emptied of the foamed composition, trigger 12 is activated so that pressurized air is added through air inlet opening 84 to force the plunger system back to the retracted position, toward end 78 of air cylinder housing 72, and mixer-applicator 8 is then ready for repeating the procedure.

The mixer-applicator of this invention may be used for both high and low-pressure applications, where air pressures are as low as about 90 psi and as high as 3000 psi. The mixer-applicator may be formed of any suitable material, so long as it can withstand the use pressure. Preferably, the plunger head is formed of non-stick material, such as polytetrafluoroethylene.

Variations on the mixture-applicator design described above may be made. For example, a plunger system operated by manually pushing can replace the air-actuated air cylinder assembly. Various designs of the mixing chamber may be employed; however, impingement mixing is preferred. Different shapes of the mixing chamber and housing, foaming chamber and housing, and air cylinder chamber and housing than that what is shown would be suitable.

The present device is particularly suited for mixing and discharge of two-part foamable compositions such as commercially available two part silicone or polyurethane foam compositions. However, one-part compositions or those haivng more than two parts may also be applied using the device. Persons skilled in the art will adjust the inlet passages to suit the particular foam composition. In the case of one-part foamable compositions of the inhibited cure type, it may be necessary to provide means for heating (not shown) the foaming chamber to effect cure. In other cases compressed gas may be added to the composition.

In using the device of this invention, foamable composition is mixed thoroughly in the mixing chamber for a first dwell period and discharged into the foaming chamber until the foaming chamber is only partially filled. Such mixing is particularly important in the case of two-part foamable compositions. In the mixing chamber itself, the composition does not foam or foams very little. Then, in the foaming chamber, the mixed foamable composition is allowed to foam and increase in viscosity to the desired degree for a second dwell period, and is then discharged from the outlet port of the foaming chamber and applied onto the desired substrate. The amount of time needed for foam development will depend on the specific foam used and the desired degree of foam development. However, for most applications, waiting a few to several seconds (5-60 seconds) will be sufficient. When the foamed composition is discharged from the foaming chamber it is more viscous but still flowable. Discharging of the foamable composition must be done before the composition becomes cured to a non-flowing mass. The amount of foam development (cell structure definition, expansion, and decrease in flowability) depends on the specific application and the materials used.

The foaming chamber must be designed to allow enough space for the desired amount of developed foam. A typical volume of the foaming chamber would be greater than 200 times larger than the volume of the mixing chamber, preferably 500 times and more preferably, 1000 times larger. Typical volumes for the foaming chamber may range from one half pint to one gallon. Typically, with this invention, the inner diameter of the foaming chamber is significantly larger than the inner diameter of the mixing chamber (e.g. five times to greater than ten times larger), although this is not necessarily always the case. With reference to FIG. 1, the dimensions shown are not necessarily drawn to the relative scales which are preferred.

Any type of reactive composition which spontaneously foams upon mixing is suitable for use in the device and method of this invention. Especially suitable compositions are those which do not cure or develop (foam and thicken) immediately or very quickly. For example, silicone foaming compositions generally do not thicken immediately, but thicken while foaming. This device provides a means by which slow-developing foams may foam and thicken before being applied.

By keeping the foamable composition in the foaming chamber until maximum expansion and viscosity is reached, the foam will spread the least and will fill or seal off voids the fastest and with the least amount of material.

These and other variations of the present invention may be made which fall within the scope of the appended claims even though such variations were not specifically discussed above.

That which is claimed is:

1. A foam mixer-applicator device for mixing a foamable composition, comprising:
   (a) a mixing head containing a mixing chamber having opposed first and second fluid inlet means for introducing impinging fluid streams into the mixing chamber;
   (b) means for supplying a continuous but interruptible flow of components of the foamable composition in a pre-pressurized, unmixed state separately to the first and second inlet means, respectively, for impingement mixing of the components in the mixing chamber during a first dwell period;
   (c) a first outlet port for discharge of the mixed foamable composition from the mixing chamber;
   (d) a dispensing head, sealingly attached to the mixing head at the first outlet port, containing a foaming chamber having a substantially greater capacity than the mixing chamber wherein the first outlet port establishes a fluid passageway between the mixing chamber and the foaming chamber;

(e) means for intermittently discharging the mixed composition from the mixing chamber through the first outlet port into the foaming chamber while arresting the flow of unmixed components entering the mixing chamber, allowing the composition to foam and acquire a higher, yet flowable viscosity during at least a second dwell period;

(f) a second outlet port, spaced substantially remote from the impinging fluid streams, for discharge of the foamed composition from the dispensing head; and (g) means for mechanically pushing substantially all of the foamed composition through the second outlet port.

2. The device of claim 1 wherein the means described in (g) further comprises an air-actuated plunger.

3. The device of claim 2 wherein the foaming chamber is substantially cylindrically-shaped with a conical end and the second outlet port is located at the tip of the conical end.

4. The device of claim 1 wherein at least one of the first and second inlet means is connected to a source of pressurized gas.

5. The device of claim 1 wherein the fluid passageway described in (d) further comprises an elongated mixing channel.

6. The device of claim 1 further comprising a handle allowing an operator to hold the mixer-applicator during use, including a valve for controlling the flow of the components to the mixing head.

7. The device of claim 6 further comprising another valve for controlling the discharge of the foamed composition from the second outlet port.

8. The device of claim 1 wherein the foaming chamber has a volume more than 200 times greater than that of the mixing chamber.

9. The device of claim 8 wherein the foaming chamber has a volume more than 1000 times greater than that of the mixing chamber.

10. A foam mixer-applicator device for mixing a foamable composition, comprising:

(a) a mixing head containing a mixing chamber having opposed first and second fluid inlet means for introducing impinging fluid streams into the mixing chamber;

(b) means for supplying a continuous but interruptible flow of components of the foamable composition in a pre-pressurized, unmixed state separately to the first and second inlet means, respectively, for impingment mixing of the components in the mixing chamber during a first dwell period;

(c) a first outlet port for discharge of the mixed foamable composition from the mixing chamber;

(d) a dispensing head, sealingly attached to the mixing head at the first outlet port, containing a foaming chamber having a substantially greater capacity than the mixing chamber wherein the first outlet port establishes a fluid passageway between the mixing chamber and the foaming chamber;

(e) a first piston reciprocable between a forward and a backward stroke, the forward stroke completely discharging the mixed composition from the mixing chamber into the foaming chamber while blocking the flow of unmixed components entering the mixing chamber, allowing the composition to foam and acquire a higher, yet flowable viscosity for a second dwell period in the foaming chamber, and the backward stroke allowing a selected amount of the components to flow into the mixing chamber prior to the forward stroke of the first piston;

(f) a second outlet port, spaced substantially remote from the impinging fluid streams, for discharge of the foamed composition from the dispensing head; and (g) a second piston having a plunger tip, for contacting the foamed composition, and being reciprocable between a forward and a backward stroke, the forward stroke of the second piston pushing substantially all of the foamed composition through the second outlet port onto a substrate following the second dwell period, and the backward stroke of the second piston retracting the second piston prior to the backward stroke of the first piston.

11. The device of claim 10 wherein at least one of the first and second pistons is air-actuated.

12. The device of claim 11 wherein the first and second pistons are both air-actuated.

13. A method of applying a flowable foam to a substrate using the mixer applicator of claim 1, comprising the steps of:

(a) mixing the separate components of a foamable composition in the mixing chamber by impingement mixing;

(b) discharging the mixed two-part composition into the foaming chamber to partially fill the foaming chamber;

(c) allowing the mixed composition to foam in the foaming chamber and increase in viscosity to a desired degree; and (d) discharging the flowable foamed composition through the second outlet port substantially remote from the impinging fluid streams onto the substrate.

14. A method of applying a flowable foam to a substrate using the mixer applicator of claim 10, comprising the steps of:

(a) mixing the separate components of a foamable composition in the mixing chamber by impingement mixing;

(b) discharging the mixed composition into the foaming chamber to partially fill the foaming chamber;

(c) allowing the mixed composition to foam in the foaming chamber and increase in viscosity to a desired degree; and (d) discharging the flowable foamed composition through the second outlet port substantially remote from the impinging fluid streams onto the substrate.

15. The method of claims 13 or 14 whereby the step (d) causes the foaming chamber to be cleaned free of the foamed composition.

16. The method of claim 15 wherein the foamable composition comprises a two-part foamable composition.

17. The method of claim 14 further comprising the step of automatically synchronizing the timing of the first and second pistons to avoid contamination of the mixing and foaming chambers.

18. The method of claim 13 wherein the foamable composition further comprises a slow-developing foam which may foam and thicken prior to being applied to a substrate.

19. The method of claim 18 wherein the foam is a silicone foam.

* * * * *